United States Patent [19]
Takahashi et al.

[11] Patent Number: 5,987,190
[45] Date of Patent: Nov. 16, 1999

[54] IMAGE PROCESSING SYSTEM INCLUDING A PROCESSOR SIDE MEMORY AND A DISPLAY SIDE MEMORY

[75] Inventors: Mistuhiro Takahashi; Seiji Tateyama; Masahide Tomita, all of Hokkaido, Japan

[73] Assignee: Hudson Soft Co., Ltd., Hokkaido, Japan

[21] Appl. No.: 08/130,575

[22] Filed: Oct. 1, 1993

[30] Foreign Application Priority Data

Oct. 1, 1992 [JP] Japan .................................. 4-284980
Oct. 2, 1992 [JP] Japan .................................. 4-289250
Oct. 9, 1992 [JP] Japan .................................. 4-298072

[51] Int. Cl.$^6$ ........................................................ G06K 9/32
[52] U.S. Cl. ........................................................ 382/293
[58] Field of Search ................................. 345/121, 122, 345/123, 213; 382/293, 276

[56] References Cited

U.S. PATENT DOCUMENTS

| | | | |
|---|---|---|---|
| 4,737,778 | 4/1988 | Nishi et al. | 345/121 |
| 4,897,636 | 1/1990 | Nishi et al. | 345/121 |
| 4,951,038 | 8/1990 | Yamamura | 340/725 |
| 5,006,837 | 4/1991 | Bowers | 345/121 |
| 5,138,307 | 8/1992 | Tatsumi | 345/121 |
| 5,196,837 | 3/1993 | Shoji et al. | 345/121 |

FOREIGN PATENT DOCUMENTS

WO 88/02155  3/1988  WIPO .............................. G06F 15/72

*Primary Examiner*—Jose L. Couso
*Attorney, Agent, or Firm*—McDermott, Will & Emery

[57] ABSTRACT

Image data are transmitted for each unit of predetermined rasters. A start timing of transmission is controlled by a control unit to provide a suitable vertical position on a screen.

7 Claims, 23 Drawing Sheets

$$\begin{pmatrix} X' \\ Y' \end{pmatrix} = \begin{pmatrix} \cos\theta & \sin\theta \\ -\sin\theta & \cos\theta \end{pmatrix} \begin{pmatrix} X \\ Y \end{pmatrix}$$

106 IMAGE DATA
EXTENSION UNIT

FIG. 18A TRANSFER CONTROL REGISTER

| 7 | 6 | 5 | 4 | 3 | 2 | 1 | 0 |
|---|---|---|---|---|---|---|---|
|   |   |   |   |   |   | RAIN INT | RAIN EN |

RAIN EN = 1 TRANSFER START
RAIN INT = 1 INTERRUPTION OF RASTER MONITORING REGISTER ENABLE

FIG. 18B DATA START ADDRESS REGISTER

| 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| -A/B | KA16 | KA15 | KA14 | KA13 | KA12 | KA11 | KA10 | KA9 | KA8 | KA7 | KA6 | KA5 | KA4 | KA3 | KA2 | KA1 | KA0 |

FIG. 18C TRANSFER START RASTER REGISTER

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| not used | | | | | | | | RASTER No. (0-262) | | | | | | | |

FIG. 18D TRANSFER BLOCK NUMBER REGISTER

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| not used | | | | | | | | NUMBER OF BLOCKS | | | | | | | |

FIG. 18E RASTER MONITORING REGISTER

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| not used | | | | | | | | RASTER No. (0-262) | | | | | | | |

SCX : START ADDRESS AREA (-256～+256)

FIG. 23
HORIZONTAL PROCESSING
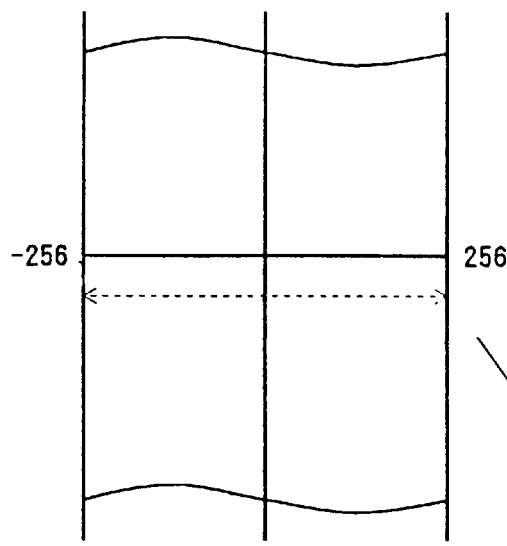
VERTICAL PROCESSING
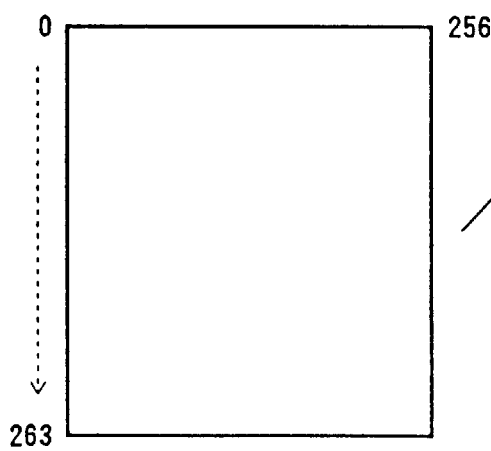
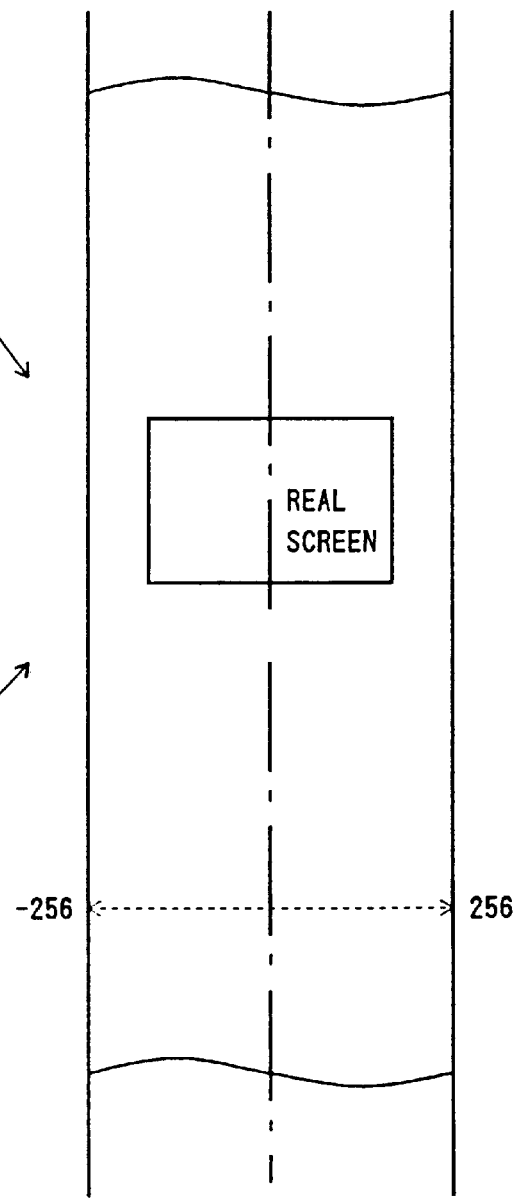

FIG. 24A

B G AFFIN COEFFICIENT  A 15                              8 7                              0

| BEFORE THE DECIMAL POINT | AFTER THE DECIMAL POINT | ← PARAMETER  A

B G AFFIN COEFFICIENT  B 15                              8 7                              0

| BEFORE THE DECIMAL POINT | AFTER THE DECIMAL POINT | ← PARAMETER  B

B G AFFIN COEFFICIENT  C 15                              8 7                              0

| BEFORE THE DECIMAL POINT | AFTER THE DECIMAL POINT | ← PARAMETER  C

B G AFFIN COEFFICIENT  D 15                              8 7                              0

| BEFORE THE DECIMAL POINT | AFTER THE DECIMAL POINT | ← PARAMETER  D

FIG. 24 B

BG AFFIN CENTER COORDINATE  X 15                                                                                      0

| X 0  (COMPLEMENT TO TWO) |  ← PARAMETER  C

BG AFFIN CENTER COORDINATE  Y 15                                                                                      0

| Y 0  (COMPLEMENT TO TWO) |  ← PARAMETER  D

IMAGE PROCESSING SYSTEM INCLUDING A PROCESSOR SIDE MEMORY AND A DISPLAY SIDE MEMORY

BACKGROUND OF THE INVENTION

The present invention relates to an image processing system, and more particularly to a game computer system processing both moving and still pictures.

In a conventional image processing system, image data stored in an external storage such as a CD-ROM, are read to be displayed on a video screen by a video encoder unit. According to this system, a memory is necessary to have a capacity for storing at least one screen data to control the video screen vertically.

In a conventional game computer, background (BG) and sprite pictures are combined on a screen to display one image. The background and sprite images are composed of plural elements, which are called characters and sprites, respectively. The background image is defined on the screen by its position, color and pattern for each character. The position of each character is defined by its coordinate. The game computer is provided with a memory, from which a virtual screen is derived so that the virtual screen is taken to have an area larger than the real screen (CRT). The real screen is scrolled by shifting a picture on the virtual screen.

The computer has a video-RAM (VRAM), which includes a background attribute table (BAT) and a character generator (CG), as shown in FIG. 1. In accordance with data in the background attribute table (BAT) and character generator (CG), the background image is managed.

In such a game computer system, plural pictures arranged at different angles are displayed successively in a predetermined order whereby the BG screen seems rotating. In some cases, such plural pictures are formed arithmetically in accordance with a matrix coordinate, as shown in FIG. 2.

In the conventional game computer system, a VRAM stores image data at once, and then a video controller VDC reads and processes the image data. The VDC supplies the processed image data to a video encoder unit VDE, so that a CRT displays the image data, as shown in FIGS. 3 and 4. Basically, the image data are processed for each screen, and therefore, the VRAM must store at least image data for one screen prior to the processing.

In the case of a moving picture, it is not necessary to store the entirety of the image data in a VRAM, as shown in FIG. 5A, because a moving picture is composed of different images for each field. That is, image data are transmitted not through the VRAM to the video encoder unit VDE, as shown in FIG. 5B. Therefore, image data for a moving picture must be stored in an external storage before the display thereof. This system may not perform special processing, such as rotation, reduction and extension. If image data for a moving picture are stored in the VRAM at once, the transmission of the image data is delayed by one field. Eventually, when a computer system deals both with moving and still pictures, one of the two may not be displayed well.

Generally, a game computer is required to deal with a large amount of data to display a video image. For instance, when a game computer employs a color display monitor of 512×512 dots, in which each luminance of RGB is defined by eight bits, each color image needs a memory capacity of about 768 k bytes (512×512×3). In a game computer, predetermined data must be processed while tens of images are displayed in one second, and therefore, image processing must be performed in a horizontal (HSYNC) period. For that reason, according to the conventional game computer, it is difficult to realize special graphic processing such as rotation, magnification, reduction and the like.

SUMMARY OF THE INVENTION

Accordingly, it is an object of the present invention to provide an image processing system, by which a moving image may be processed to be rotated, compressed, extended, etc. in addition to normal processing.

It is another object of the present invention to provide an image processing system, in which a memory arranged at a display side may be used effectively.

According to the invention, image data are divided into plural parts to be transmitted, and then the parts of the image are displayed successively to form a moving image. The display position of the image is controlled by a control unit.

According to a first feature of the present invention, image data are transmitted for each unit of predetermined rasters. A start timing of transmission is controlled by a control unit to provide a suitable vertical position on a screen.

According to a second feature of the present invention, an AFFIN transformation is performed to at least one background picture for each raster.

According to a third feature of the present invention, a route of transmission of image data are switched whether being through a VRAM or not.

BRIEF DESCRIPTION OF THE DRAWINGS

FIGS. 18A to 18E are diagrams showing the configurations of registers for the image data extension unit, according to the invention.

FIG. 23 is an explanatory diagram showing a relation between real and virtual screens, according to the invention.

FIGS. 24A and 24B are diagrams showing the configurations of AFFIN transformation coefficient and AFFIN transformation center coordinate registers, respectively, according to the invention.

DETAILED DESCRIPTION OF THE INVENTION

Figure 1:
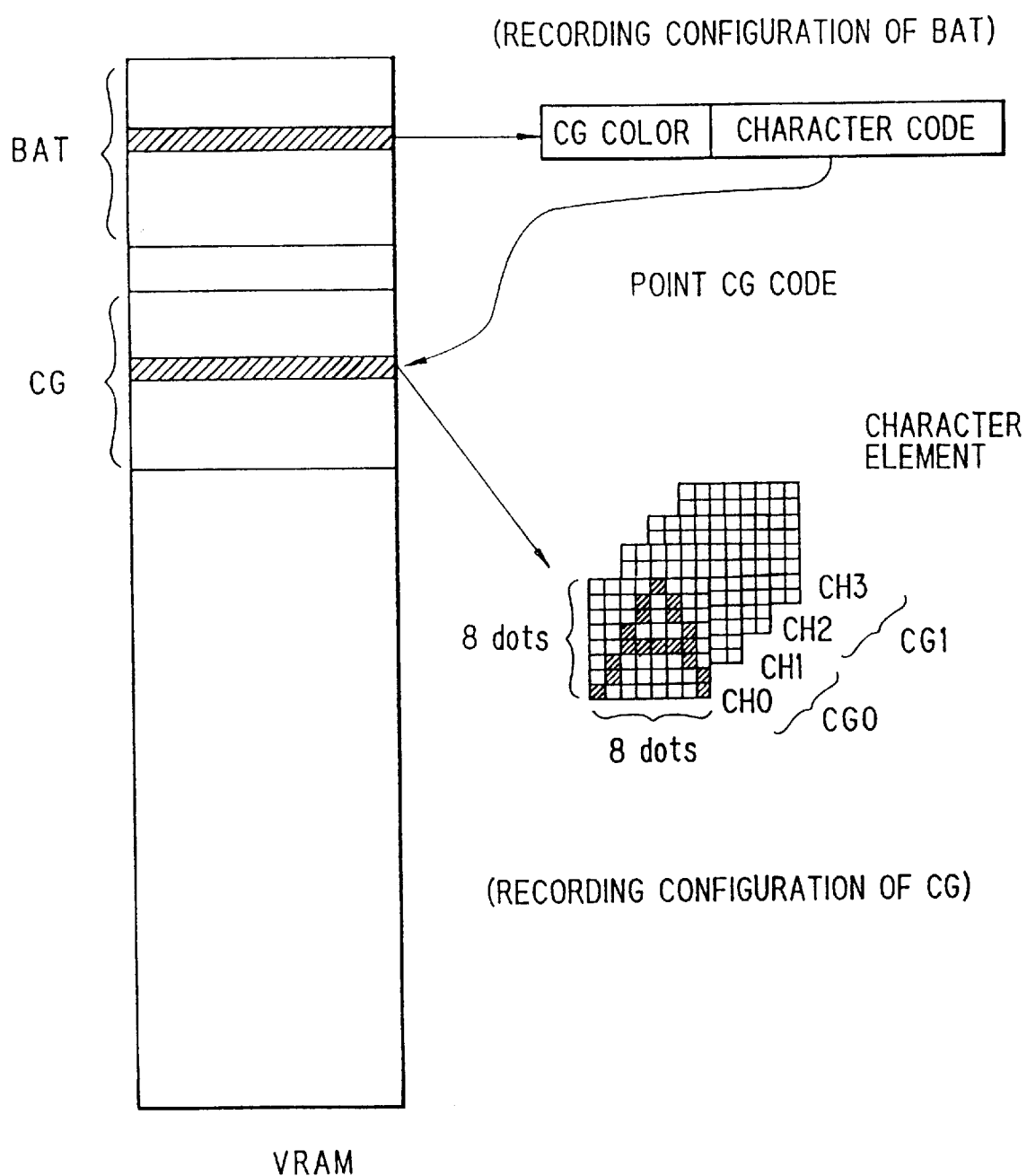
FIG. 1 is an explanatory diagram illustrating the structures of a VRAM, according to a conventional computer system.
Figure 2:
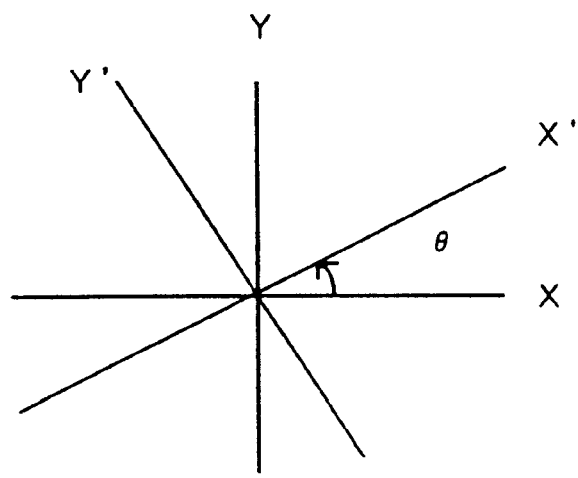
FIG. 2 is an explanatory diagram showing a two-dimensional coordinate and an equation used in arithmetic for rotation of an image, according to the conventional computer system.
Figure 3:
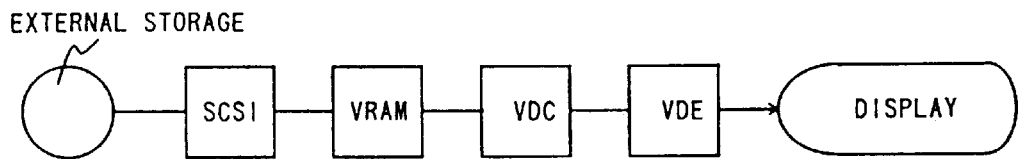
FIG. 3 is a block diagram illustrating a conventional image processing system dealing only with still pictures.
Figure 4:
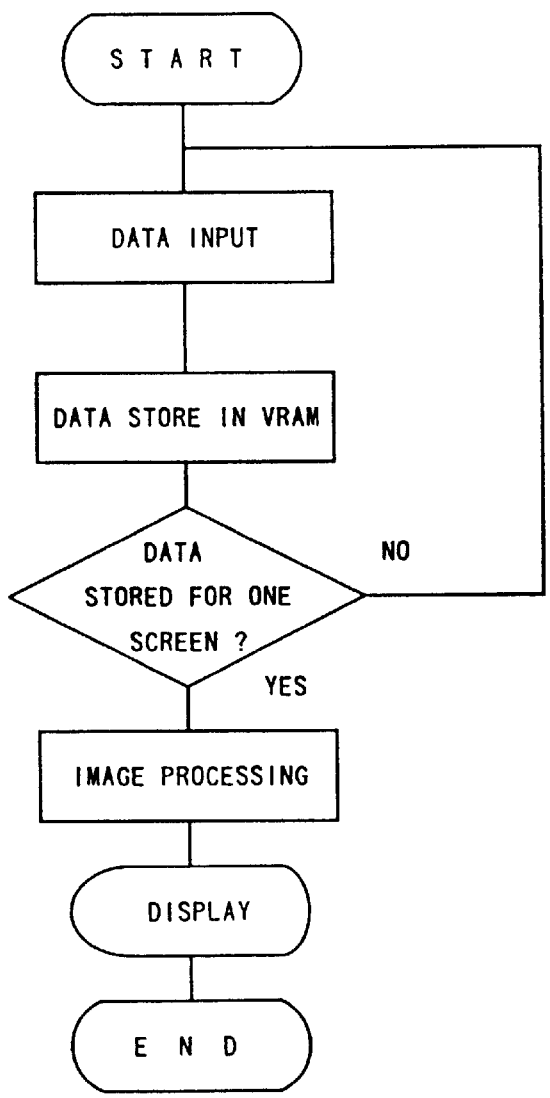
FIG. 4 is a flow chart showing the operation of the conventional image processing system, shown in FIG. 3.
Figure 5A:
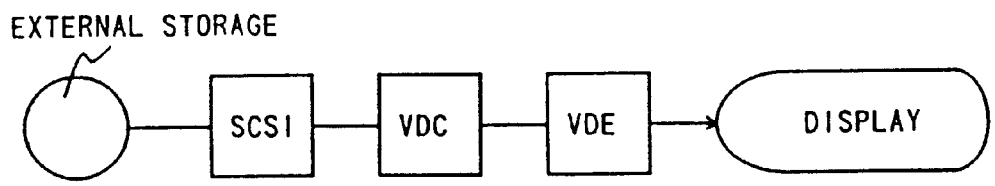
FIG. 5A is a block diagram illustrating another conventional image processing system dealing only with moving pictures.
Figure 5B:
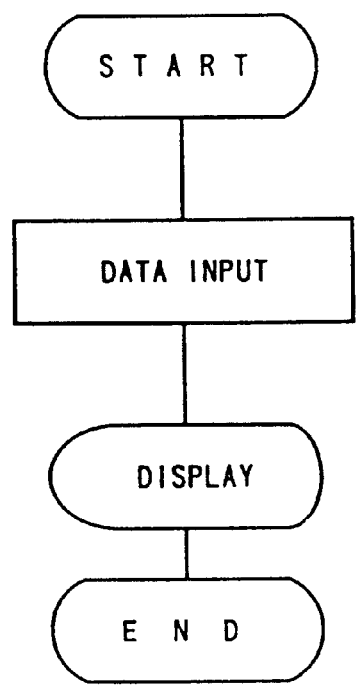
FIG. 5B is a flow chart showing the operation of the conventional image processing system, shown in FIG. 5A.
Figure 6:
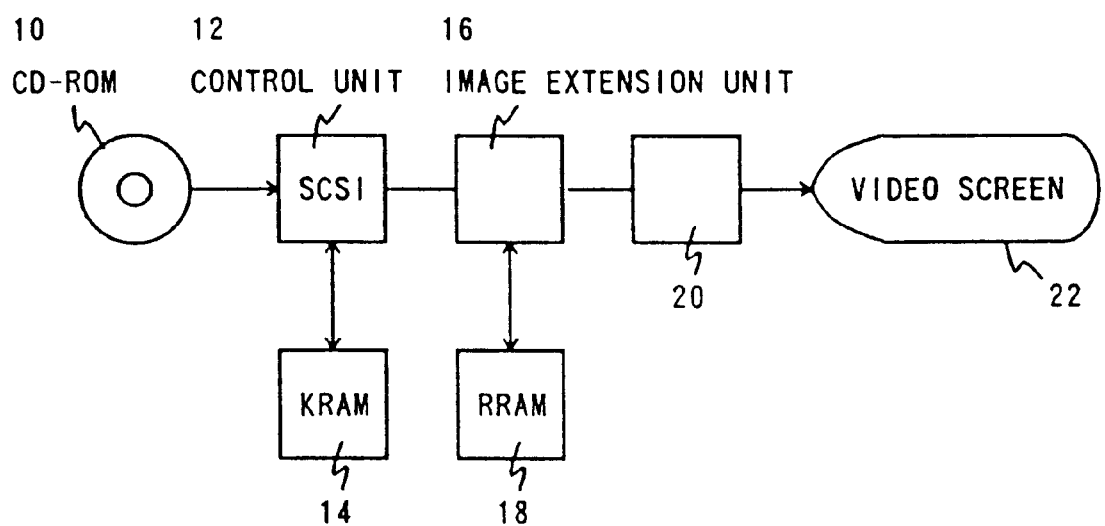
FIG. 6 is a block diagram illustrating an image processing system according to the invention.

FIG. 6 shows an image processing system according to the invention, which includes a CD-ROM 10 storing both natural and animation pictures, a control unit 12 with a KRAM 14 storing data read from the CD-ROM, an image data extension unit 16 with an RRAM 18, a video encoder unit 20 and a video screen 22. The control unit processes image data to be rotated, compressed, extended, etc. The control unit adjusts a display timing to transmit image data for each unit of predetermined rasters to the image data extension unit. The image data extension unit extends compressed image data to be displayed on the video display.

Figure 7:
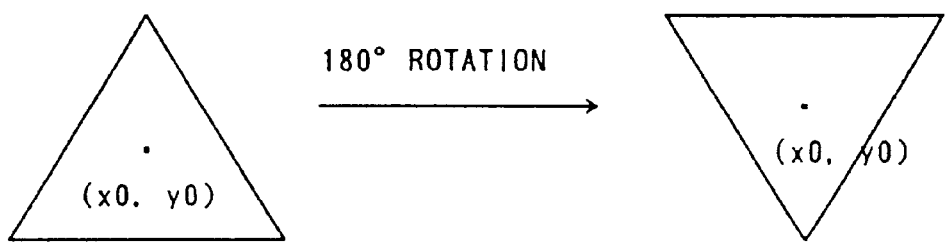
FIG. 7 is an equation for an "AFFIN"-transformation (inverse transformation), according to the invention.

An AFFIN transformation (inverse transformation) is a process for extending, reducing or rotating a picture, centering around a point (X0, Y0). The AFFIN transformation is carried out as shown in FIG. 7 and as follows:

$$A = \alpha \cos \theta$$

$$B = -\beta \sin \theta$$

$$C = \alpha \sin \theta$$

$$D = \beta \cos \theta$$

$\alpha$ = reduction rate in X direction $\beta$ = reduction rate in Y direction $\theta$ = rotation angle (X0, Y0): center coordinate (X1, Y1): coordinate after inverse transformation (X2, Y2): coordinate before inverse transformation When the reduction rate $\alpha$ is "n", the length in X direction becomes one n-th (1/n). In the rotating process, the position of the picture varies depending on the position of the rotation center.

Figure 8:
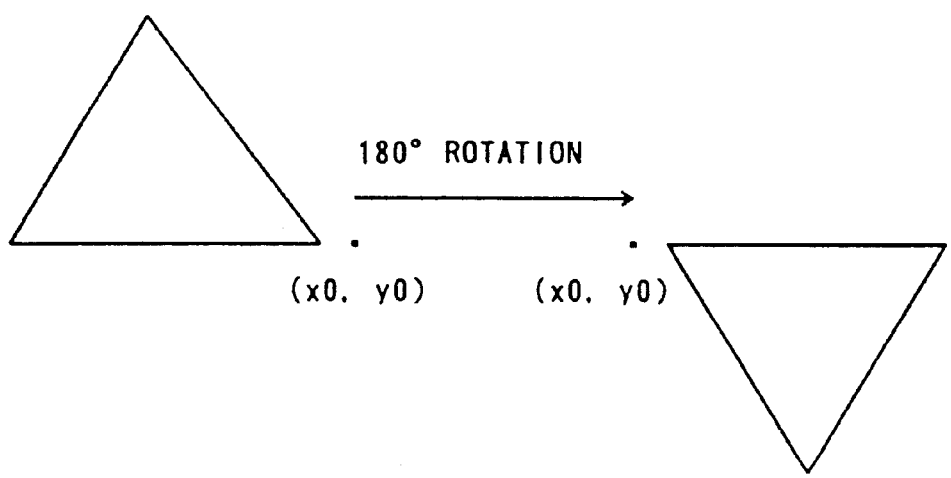
FIG. 8 is an explanatory diagram showing the operation of the "AFFIN" transformation.

For example, when a center coordinate (X0, Y0) is positioned at the center (center of gravity) of a regular triangle to be rotated by 180 degrees, the triangle is placed upside down at the same position, as shown in FIG. 8. When a center coordinate is positioned out of the regular triangle to be rotated by 180 degrees, the triangle is placed upside down point-symmetrically to the center coordinate.

Figure 9:
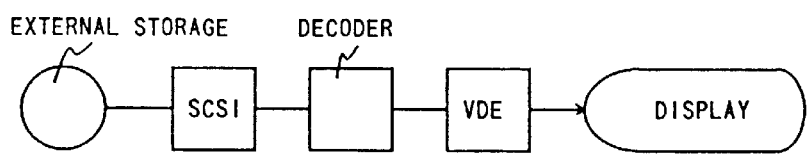
FIG. 9 is a block diagram illustrating an image processing system that deals only with compressed still pictures.

In general, image data are compressed to be transmitted, because an image to be processed needs a large amount of data. The compressed data are spread out by a decoder before being displayed. When a moving picture is treated, a decoder is connected between an SCSI and a VDE, as shown in FIG. 9. According to the system, image data can not be processed to be reduced, extended, rotated, etc.

Figure 10:
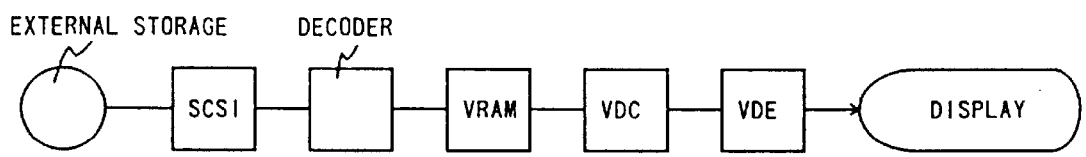
FIG. 10 is a block diagram illustrating an image processing system that deals with both compressed still and moving pictures.

FIG. 10 shows another type of image processing system, which is provided with a VRAM and a video controller VDC. In this system, decoded image data are stored in the VRAM at once, and then the image data are processed by the video controller. The VRAM stores image data for one screen (field). According to the system, the image data is displayed lagging behind by one field. Therefore, the system is unsuitable to be used for a game computer.

Figure 11:
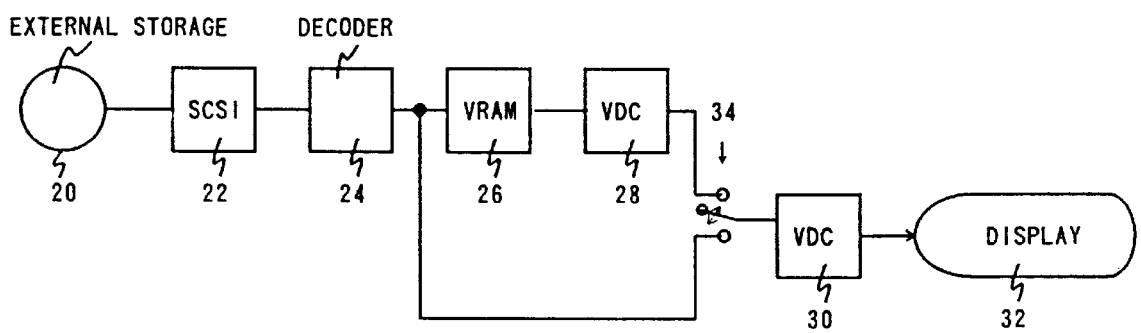
FIG. 11 is a block diagram illustrating an image processing system dealing with both compressed still and moving pictures, according to the invention.

FIG. 11 shows an image processing system according to the invention, which includes an external storage 20, an SCSI 22, a decoder 24, a VRAM 26, a VDC 28, a VDE 30, a display monitor 32 and a toggle switch 34 controlled by a CPU.

Figure 12:
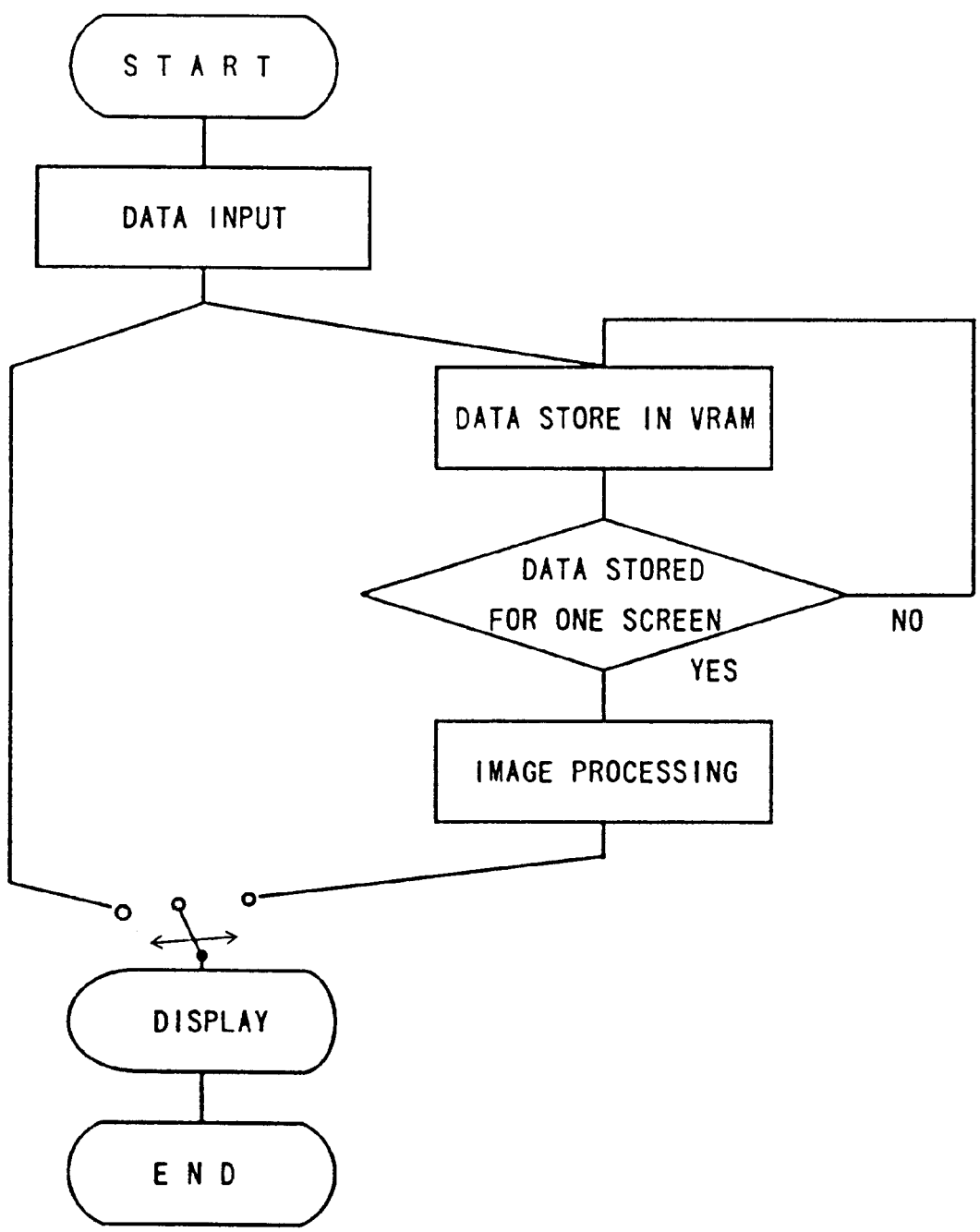
FIG. 12 is a flow chart showing the operation of the image processing system shown in FIG. 11.

FIG. 12 shows the operation of the image processing system. In this system, when the toggle switch is connected to the VDC, image data are transmitted through the VRAM and VDC to the VDE, so that the VDE may process the image data to be reduced, extended, rotated, etc. On the other hand, when the toggle is connected to the decoder, the image data are transmitted to the VDE directly skipping the VRAM and VDC.

Figure 13:
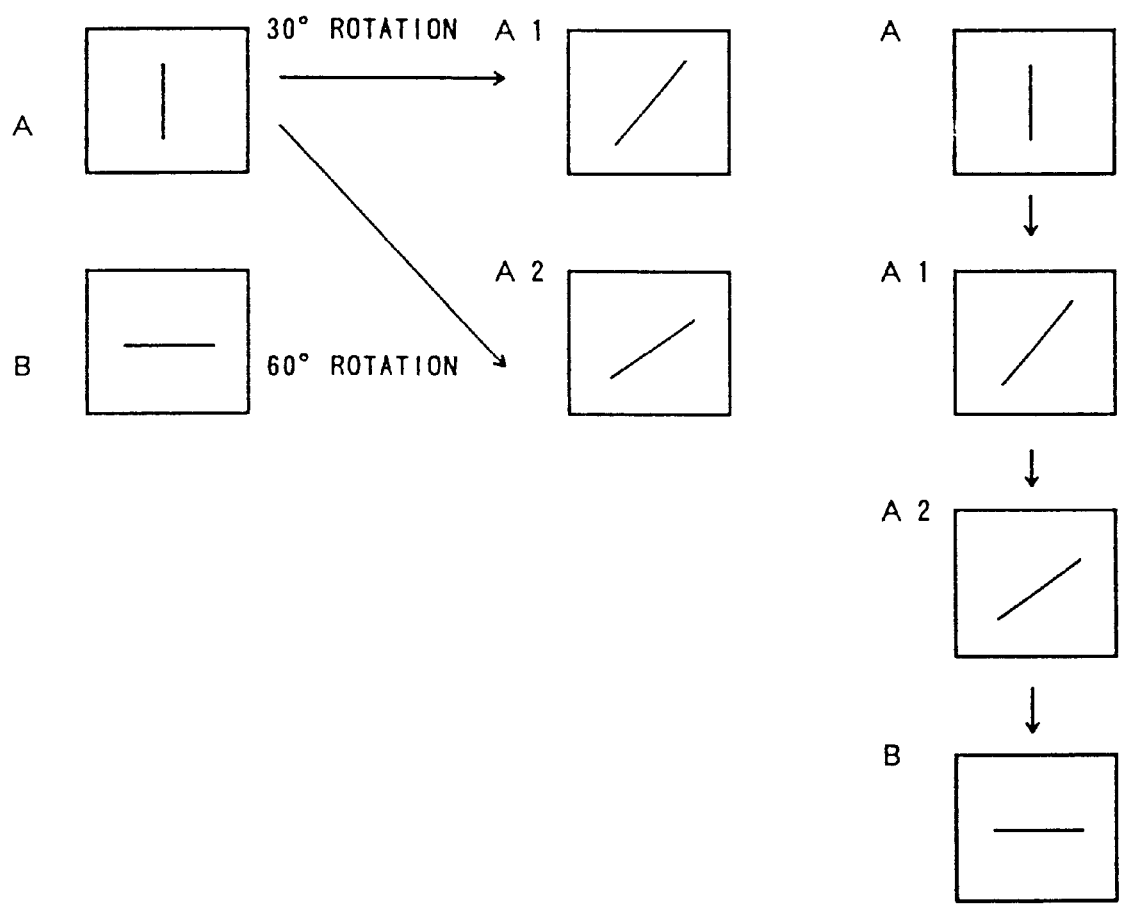
FIG. 13 is a diagram showing the operation of the image processing system shown in FIG. 11.

The system uses two base pictures A and B, which are displayed directly, and two intermediate pictures A1 and A2, as shown in FIG. 13. The intermediate pictures A1 and A2 are formed by rotating the picture A by 30 and 60 degrees. In operation, the intermediate picture A1 is formed while the base picture A is being displayed first, and then the picture A1 is displayed following the base picture A. The intermediate picture A2 is formed while the picture A1 is being displayed, and then the picture A2 is displayed following the picture A1. After that, the base picture B is displayed following the intermediate picture A2. This processing is carried out continuously so that the standing line, shown in the picture A, seems to be rotated by 90 degrees gradually.

Figure 14:
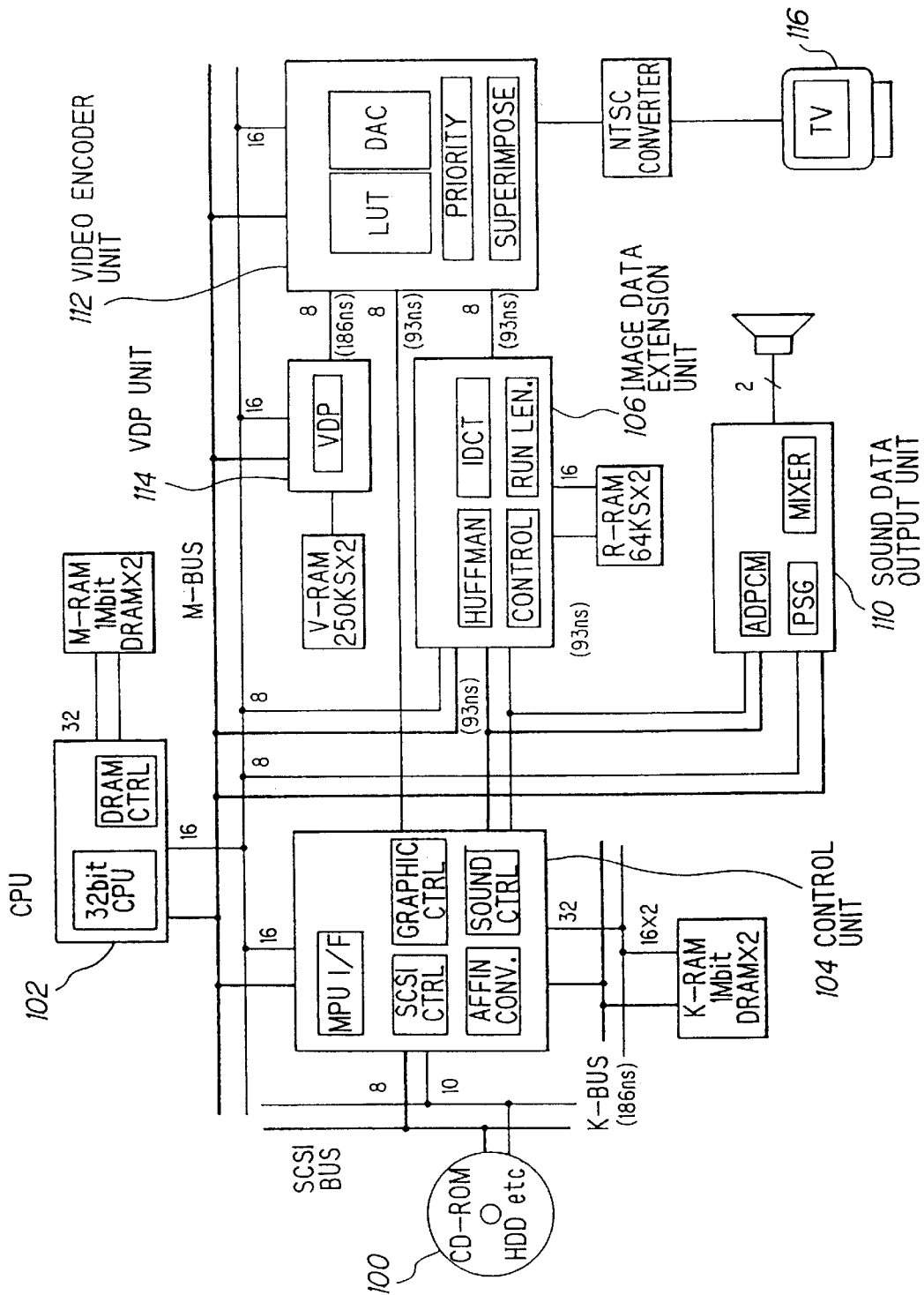
FIG. 14 is a block diagram illustrating a computer system according to the invention.

FIG. 14 shows a computer system of the invention, which includes a game-software recording medium 100 such as a CD-ROM, a CPU 102 of the 32-bit type, a control unit 104 for mainly controlling transmission of image and sound data and interfacing most devices to each other, an image data extension unit 106, an image data output unit, a sound data output unit 110, a video encoder unit 112, a VDP unit 114 and a TV display 116. Control unit 104, image data extension unit 106, video encoder unit 112 and VDP unit 114 are mounted on a common IC chip.

CPU 102, control unit 104, image data extension unit 106 and VDP unit 114 are provided with their own memories M-RAM, K-RAM, R-RAM and V-RAM, respectively.

Figure 15:
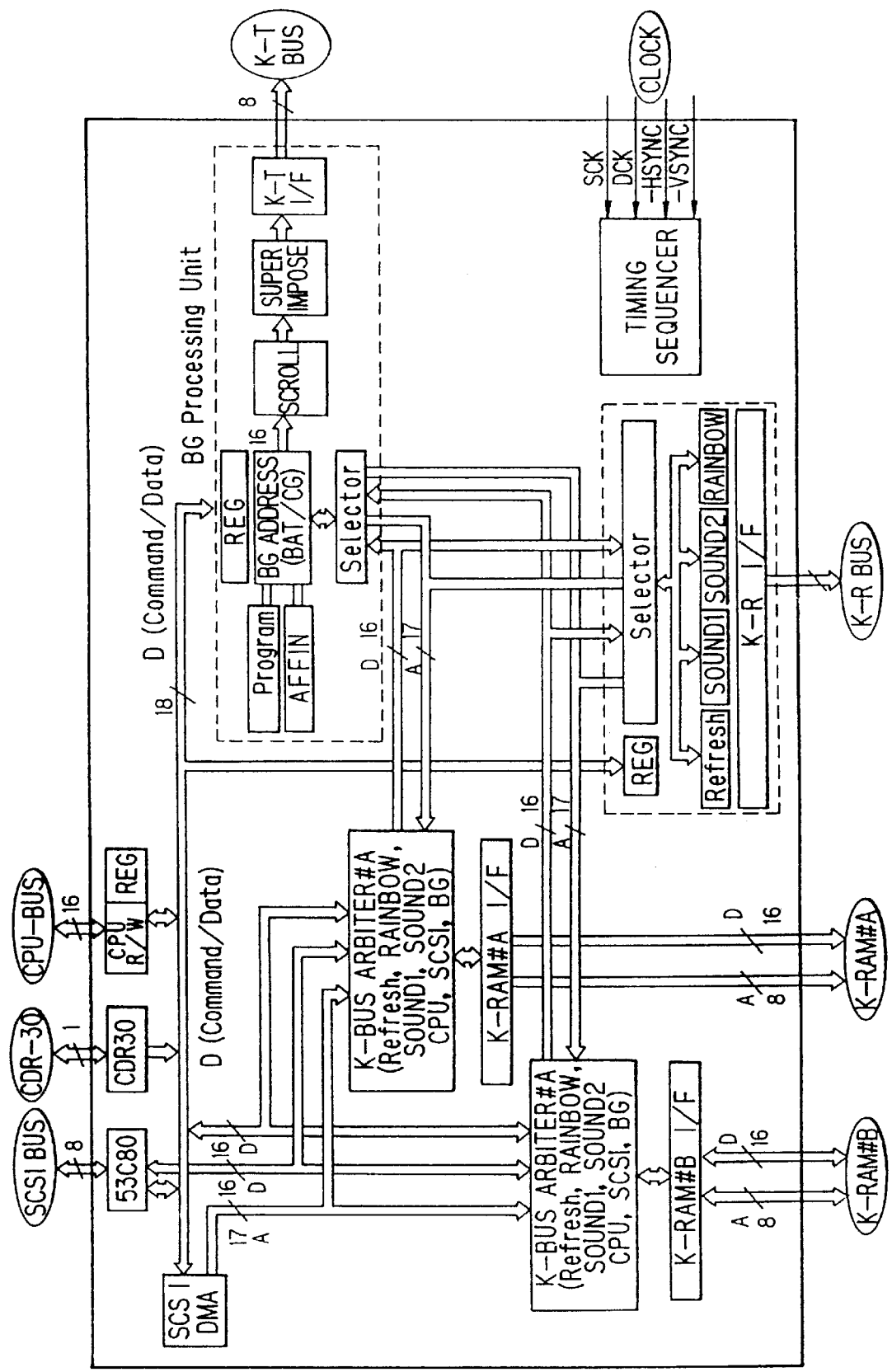
FIG. 15 is a block diagram showing a control unit, shown in FIG. 14.

FIG. 15 shows control unit 104 with the K-RAM, which buffers imaged data transmitted from the CD-ROM. The K-RAM can store a variety of types of data such as 8 bit and 16 bit data, and may deal with four BG pictures simultaneously to form one background image.

Figure 16:
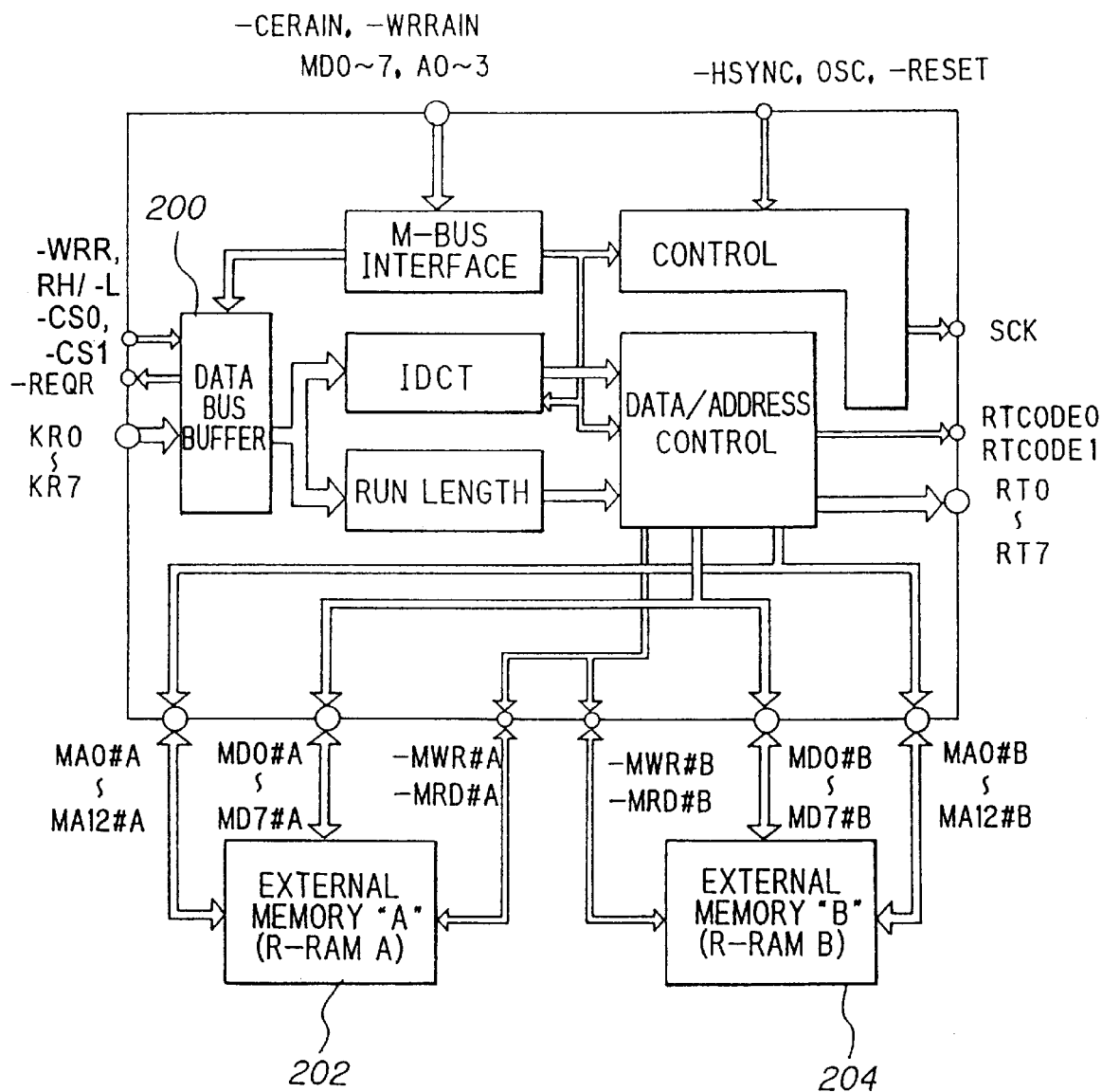
FIG. 16 is a block diagram showing an image data extension unit, shown in FIG. 14.

FIG. 16 shows image data extension unit 106, which is provided with a data bus buffer 200 storing image data supplied from the control unit and the like. The image data are divided into plural blocks to be transmitted to predetermined units.

External memory "R-RAM A" and "R-RAM B" 202 and 204, each having a capacity for 16 rasters (64K bits), store decoded data. These memories are used alternatively to increase the process speed of image data.

The image data extension unit deals with IDCT and run-length images, which represent a moving-natural-picture produced by IDCT decoding and a moving-animation-picture compressed in accordance with run-length data, respectively. In each of the IDCT and run-length image, the compressed image occupies "256 dots×240 rasters" for each field. For the IDCT image, 1677 display colors are used. The run-length image are displayed in four run-length color modes of 16, 32, 64 and 128 by the pallet system.

The image data extension unit also includes data bus terminals KRO to KR7 for receiving data transmitted from the control unit, and data request terminal -REQR for supplying a data request signal to the control unit. In response to the request signal, compressed image data are supplied from the control unit. That is, "-REQR=0" and "-REQR=1" represent data request and data stop, respectively.

The image data extension unit needs to decode the compressed image data of 16 rasters within a 16 raster period. For that reason, 16 raster data begin to be transmitted to the image data extension unit in a 16 raster period prior to its display time so that its transmission processing is finished before the previous image is displayed completely.

The image data extension unit has no information on where the screen is scanned to, and therefore, image data are transmitted in accordance with a signal from the control unit. Image data stored in the image data extension unit are displayed in synchronization with a 16th HSYNC signal after the image data are supplied from the control unit.

Figure 17:
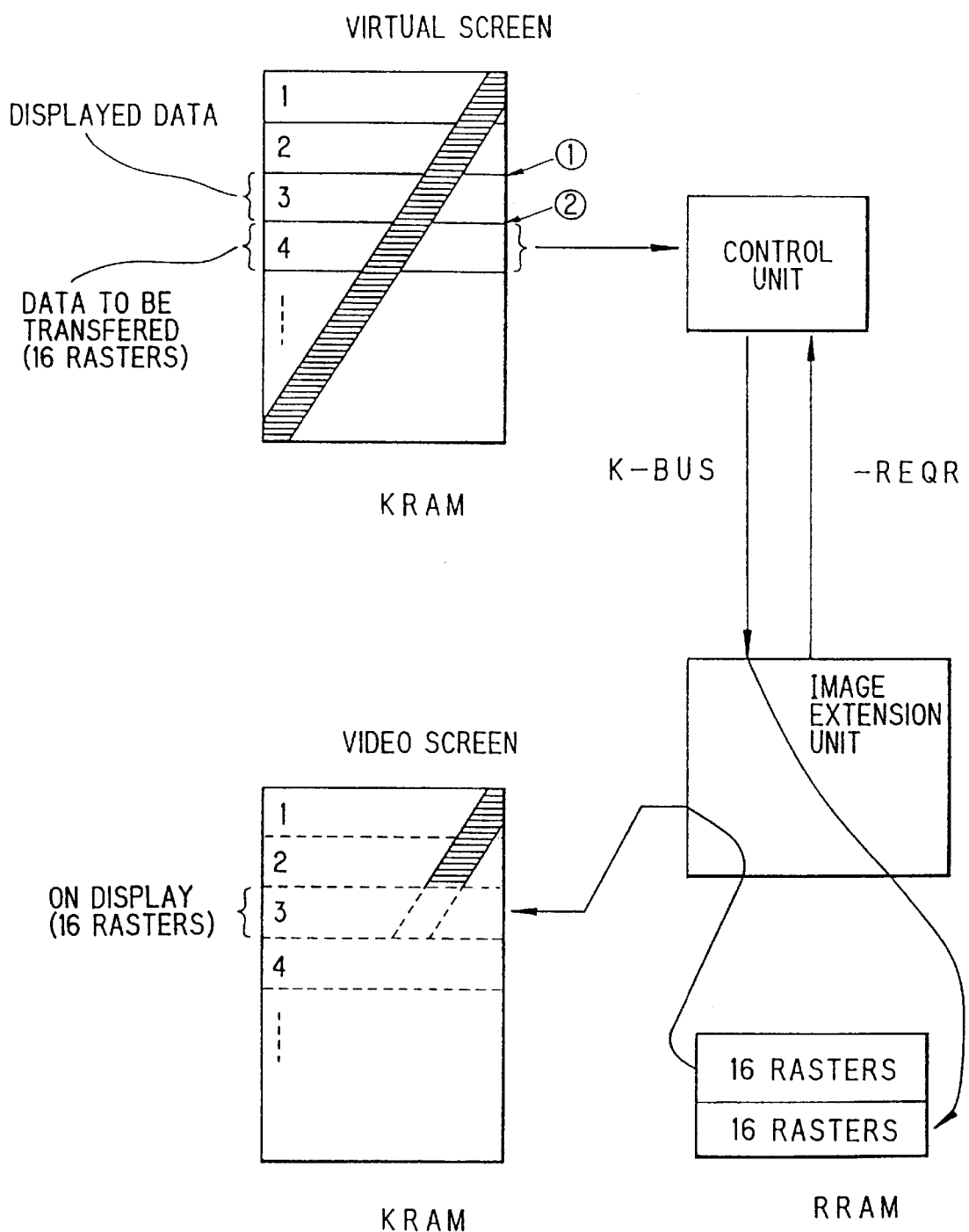
FIG. 17 is a diagram showing the operation for a transmission of imaged data, according to the invention.

FIG. 17 shows the operation of the display timing of the video screen. In this embodiment, when a third data of 16 rasters are displayed on the video screen (real screen), a fourth data of 16 rasters are transmitted from the control unit to the image data extension unit, and the transmission is finished before the third data are displayed completely on the video screen. This process is repeated until one screen image is displayed on the video display; this is called "normal reproduction".

The image data extension unit has an FIFO (First In-First Out) memory for storing image data supplied from the control unit. The FIFO supplies a disable signal (-REQR=1) to the control unit to disable a transmission of data temporarily when the FIFO is filled up with data.

FIGS. 18A to 18E show the configurations of registers built in the control unit. A transfer control register, shown in FIG. 18A, stores data for specifying enabling and disabling of data transmission. When a disable signal is supplied from the transfer control register to the image data extension unit while some data are transmitted from the image data extension unit, the data transmission stops.

A start address register, shown in FIG. 18B, stores data for specifying an initial address of the K-RAM, which stores data for the image data extension unit. It begins with the initial address to transmit data stored in the K-RAM through the control unit. When block data are treated, an access address of the data is increased automatically.

A transfer start register, shown in FIG. 18C, stores data for instructing the start of transmitting data for each raster. When the instruction signal is supplied to the control unit, image data are transmitted from the control unit to the image data extension unit.

A transfer block number register, shown in FIG. 18D, stores data for specifying the number of blocks to be transmitted to the image data extension unit, each block being composed of 16 rasters.

If the contents of any registers are not changed, the same image is again displayed on the same frame. Basically, the registers become effective instantly after their setting; however, when the register is set while a data block is transmitted to the image data extension unit, the register becomes effective after the transmission.

The control unit transmits image data to the image data extension unit, only when the K-BUS has been arbitrated, the image data extension unit has been ready to be accessed and the request signal (-REQR=0) has been supplied from the image data extension unit. On the other hand, data transmission by the control unit to the image data extension unit is disabled when at least one of the following conditions is met:

(1) The image data extension unit has not processed any data yet.

(2) The image data extension unit has the FIFC in the full state.

(3) While HSYNC are counted by 16 times since the first data of 16 lines are received by the image data extension unit, the data have been read entirely.

Therefore, when a first bit of data to be transmitted is disabled, no data is transmitted.

Figure 19:
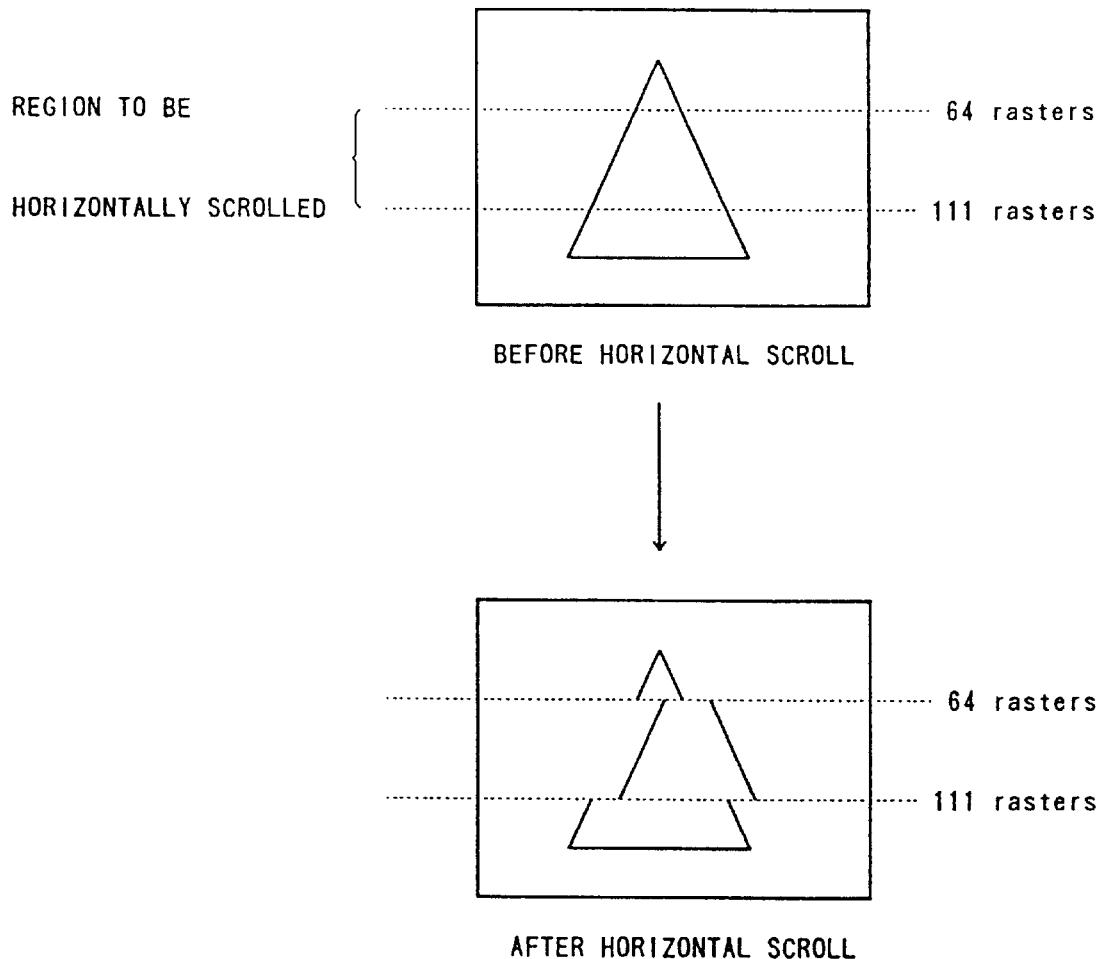
FIG. 19 is an explanatory diagram showing a change of screen in the case where three blocks in sixty-four rasters are horizontally scrolled.
Figure 20:
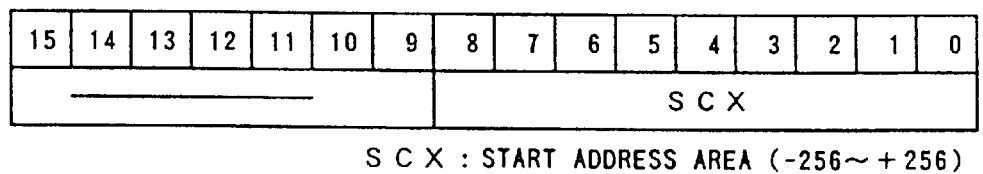
FIG. 20 is a diagram showing the content of a horizontal scroll register in the image data extension unit, according to the invention.

FIG. 19 shows change of screen when three blocks (=16×3 rasters) in sixty-four rasters are horizontally scrolled to the right by 20 dots. The horizontal scroll is performed under control of the control unit and image data extension unit. The amount (dots) of horizontal scroll is set at a horizontal scroll register in the image data extension unit, shown in FIG. 20, and the timing is instructed by registers in the control unit.

Figure 21:
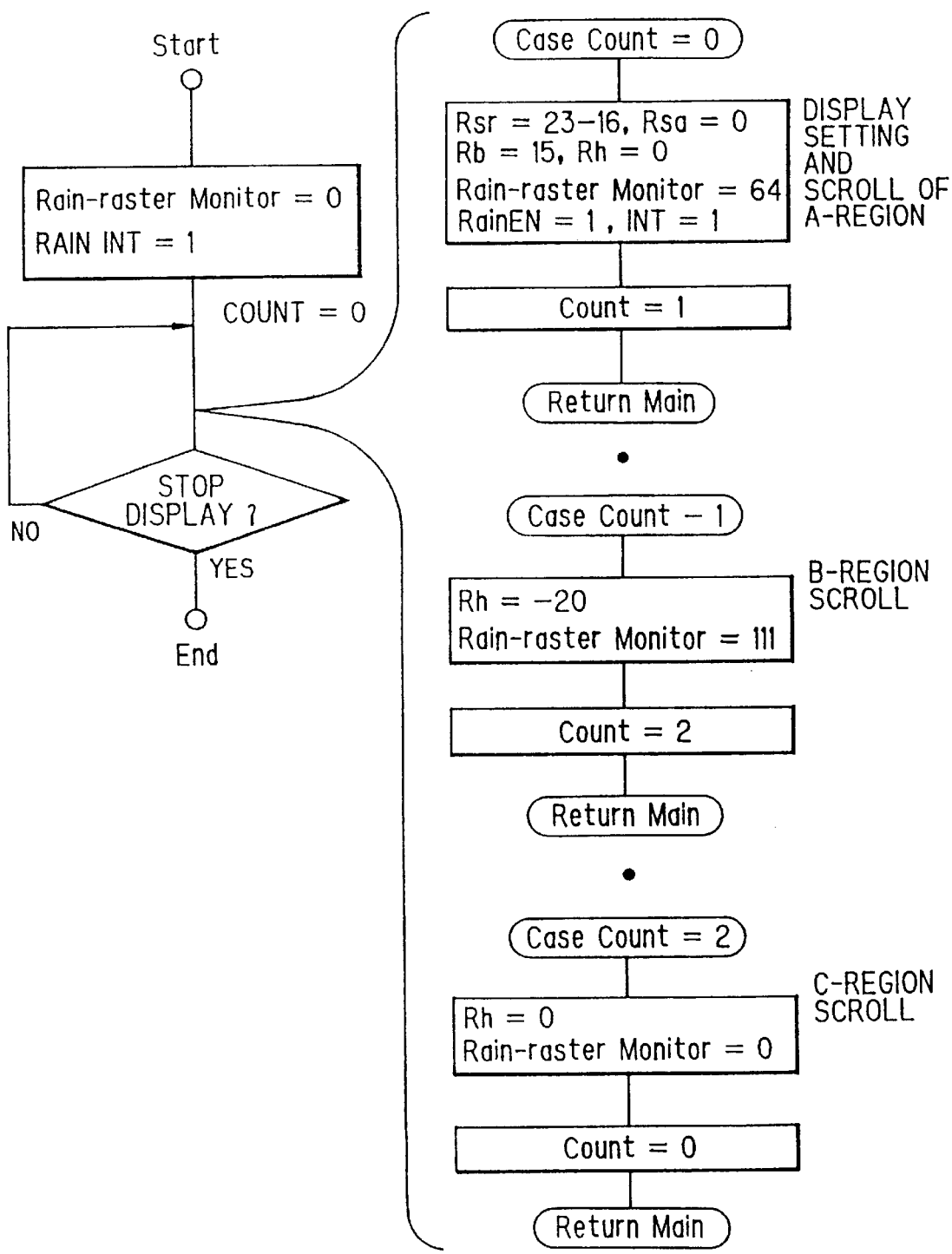
FIG. 21 is a flow chart showing algorithms for horizontal scroll processing, according to the invention.

Such horizontal scroll is performed in an interrupt processing as shown in FIG. 21.

(1) A Rain-raster monitor register is set at "0", which is equivalent to VSYVG, to provide an interrupt.

(2) In response to the interruption, display setting is carried out and a raster position to be scrolled is set in the Rain-raster monitor register.

(3) The horizontal scroll value is set, and a raster position to be returned is set in the Rain-raster monitor register.

(4) The scroll value is returned to its normal value, so that an image, as shown in a lower diagram of FIG. 19, is displayed.

On the other hand, a vertical scroll is controlled by a different way depending on the scroll direction. When the screen is scrolled up in a range of 0 to 15 lines, a value in the data start raster register is changed. When the screen is scrolled up in a range over 16 lines, a value in the data start raster register is changed for each block, and the data start address register is changed at the same time.

Figure 22:
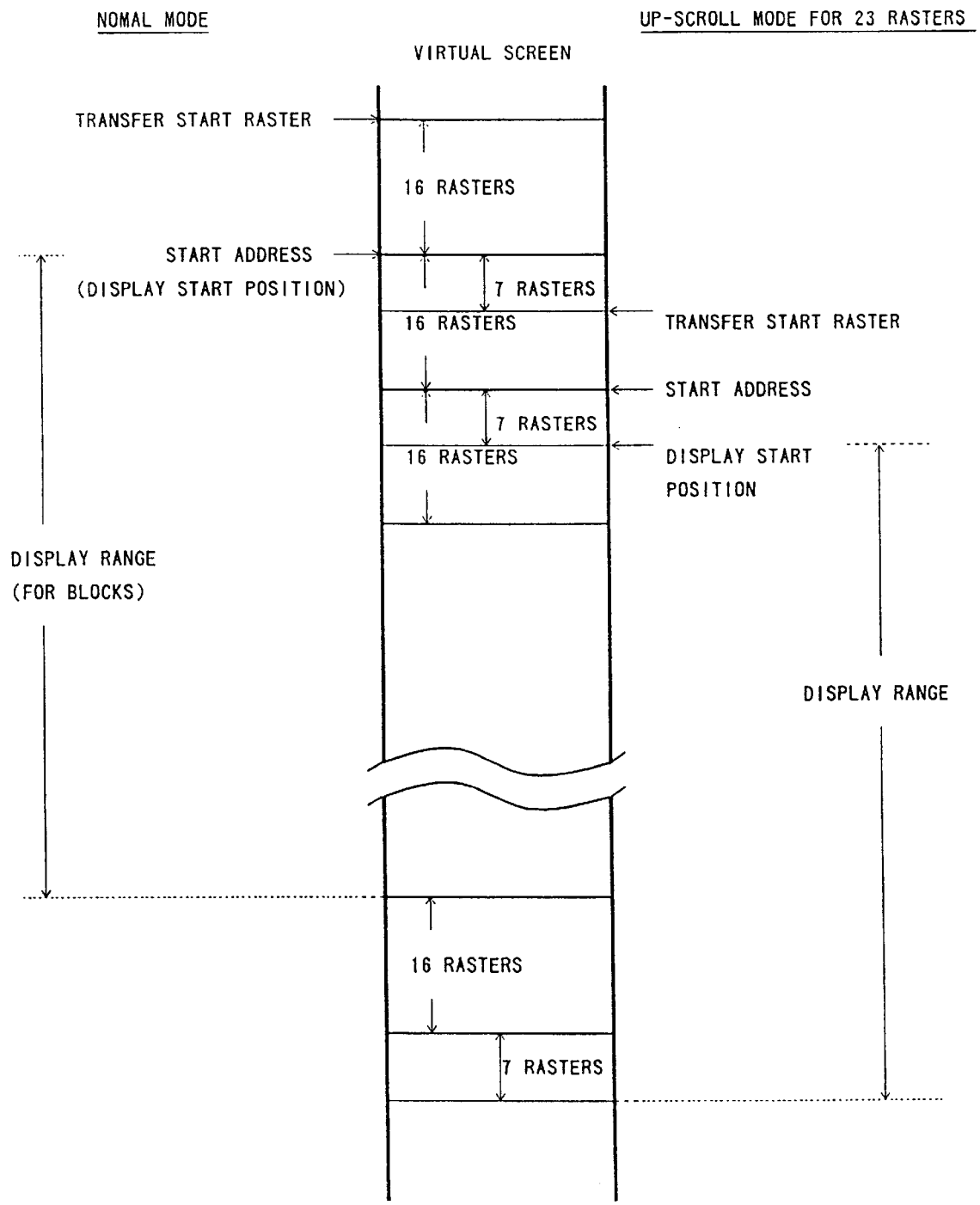
FIG. 22 is an explanatory diagram showing a relation between a start address and a transfer start raster in a twenty-three raster up-scroll mode, according to the invention.

FIG. 22 shows a relation between a start address and a transfer start raster in a twenty-three raster up-scroll mode.

In this mode, a first address of the next 16 lines data are set to the data start address register, and a value given by subtracting seven from a value in the normal reproducing mode is set to the start raster register so that the screen is scrolled up by 23 lines. This process is equivalent to that where the data are transmitted from a position at 23 lines lower than the normal position, whereby the screen is displayed from the 23rd lines.

FIG. 23 shows a relation between virtual and real screens derived from the KRAM. The real screen is controlled in horizontal and vertical directions by the image data extension unit and control unit, respectively.

According to the invention, a display position is controlled only by setting the registers, and therefore, a simple program may be used for image processing. Further, a memory arranged at a display side is not required to have a large capacity, because image data are transmitted for each unit of predetermined rasters from a control side to the display side. When image data are transmitted for each 16 rasters, the memory capacity of the display side becomes one sixteenth as compared to that of the conventional system. This invention is useful especially for a system dealing with many colors to display an image.

Next, a second preferred embodiment, which uses basically the same components shown in FIGS. 14 and 15, will be explained. In this embodiment, the algorithms for the AFFIN transformation are installed as being hardware. The control unit may deal with four BG pictures BG0 to BG3; however, the AFFIN transformation is performed only to the BG0.

AFFIN coefficients A, B, C and D are specified by AFFIN-transformation coefficient registers shown in FIG. 24A, and the center coordinate of a rotation is specified by BG AFFIN-transformation center coordinate X and Y registers shown in FIG. 24B. The coefficients A, B, C and D and the center coordinate (X0, Y0) correspond to parameters in the formulas shown in FIG. 7. In each of the registers, figures before and after the decimal point of the coefficient are arranged at the first and last 8 bits, respectively. The center coordinate is defined in accordance with the coordinate of an original image. Each register keeps a value set therein until the following value is set. Each register becomes effective after the next HSYNC signal.

Figure 25:
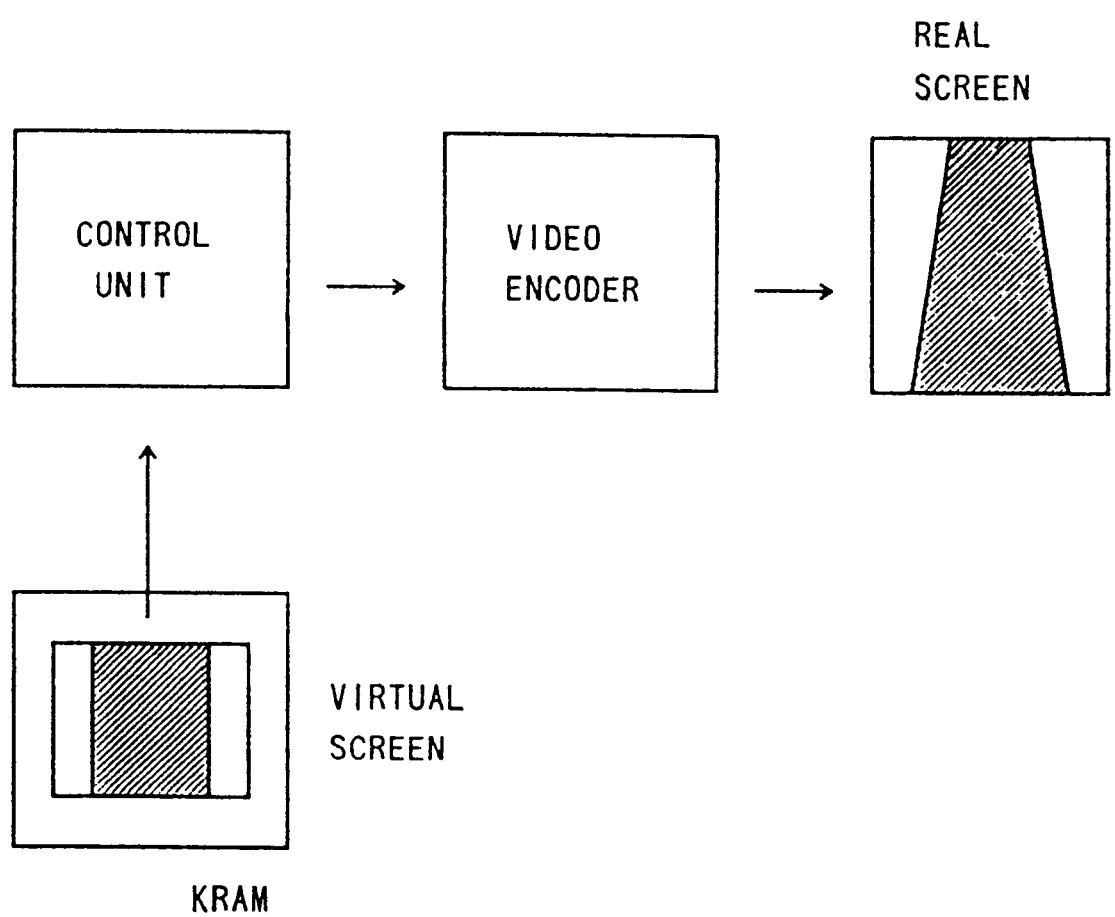
FIG. 25 is an explanatory diagram showing steps for data transmission, according to the invention.

FIG. 25 shows an image reducing process, in which a straight road illustrated on a virtual screen is reduced by the control unit, and then the road is displayed on a video screen (real screen). On the video screen, the top of the road is reduced to one fourth and the bottom is displayed at the same magnification, that is the picture (road) is displayed in perspective. In this case, a reduction rate "α" of the X direction is calculated for each raster in accordance with the following equation;

$$\alpha=3\times(R-r)/R+1$$

In this equation, "R"=(raster number −1), and "r" is decreased one by one from "R" so that the number becomes 0 before the last raster is displayed. When the top portion of the picture is displayed, "α" becomes 4. When the bottom of the picture is displayed, "α" becomes 1. In this case, a rotation angle θ becomes 0 and the center coordinate becomes (X0, Y0), because no rotation processing is performed. Therefore, the AFFIN transforming coefficients A, B, C and D are given by the following equations, respectively;

$$A=\alpha \cos(\theta)=\alpha$$

$$B=-\beta \sin(\theta)=0$$

$$C=\alpha \cos(\theta)=\alpha$$

$$D=\beta \sin(\theta)=0$$

Figure 26:
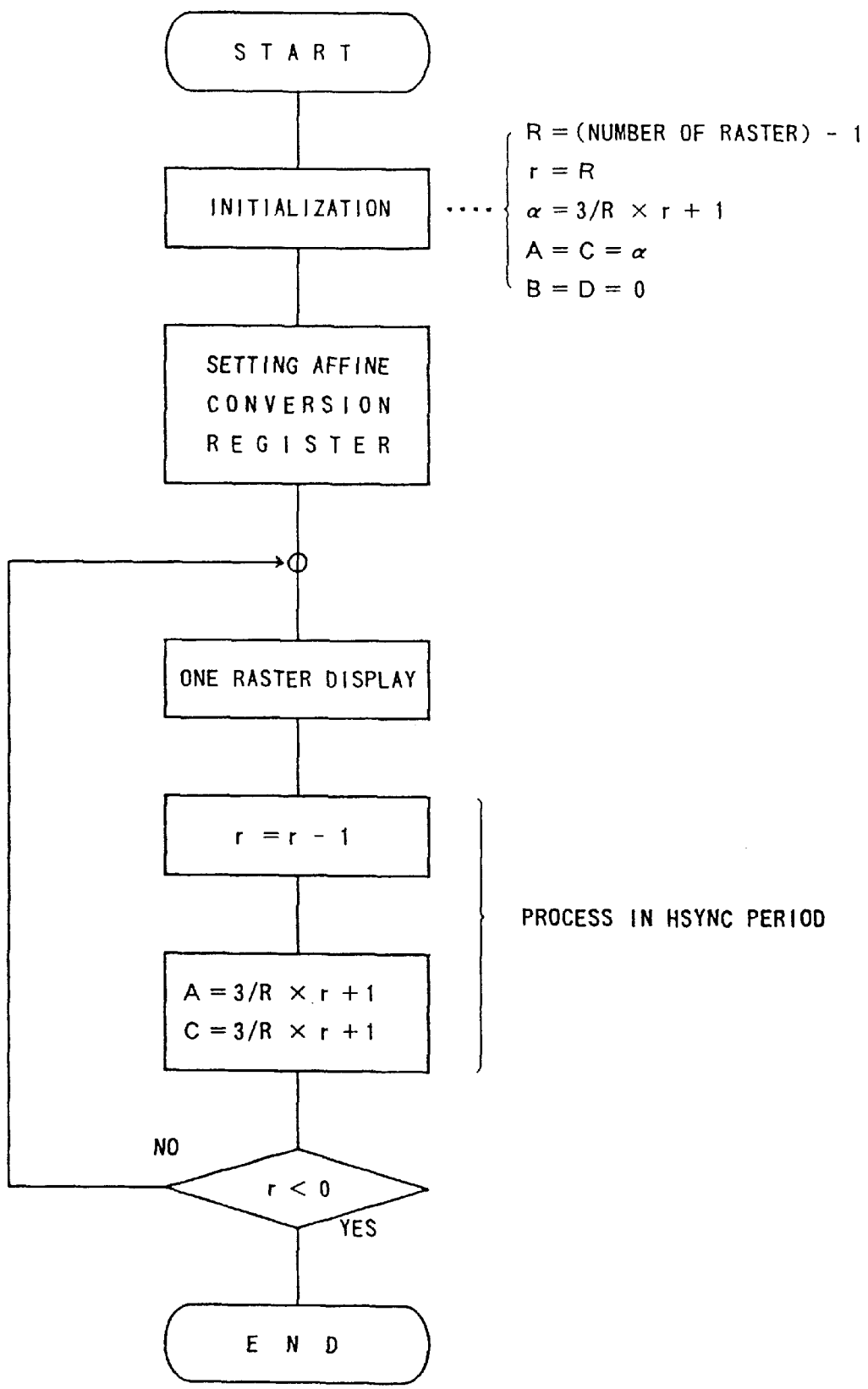
FIG. 26 is a flow chart showing the operation of the computer system when each raster has its own compression coefficient, according to the invention.

FIG. 26 shows a flow chart of the image reducing operation mentioned before. In this loop, "r", "A" and "C" are calculated within the HSYNC period; actually the calculations are performed in a horizontal-synchronization interruption period. This processing is implemented to display pictures having different reduction rates. If the screen is uniformly reduced throughout, a reduction rate "α" is given at an initial process, and the rate is set in the BG AFFIN transformation register. This process may be also adapted for rotation processing.

According to the invention, the AFFIN transformation is performed for each raster, and therefore, rotation, reduction and extension processing of an image is realized only by setting of registers.

Next, a third preferred embodiment employing the computer system, shown in FIG. 14, used for the previous embodiments, will be explained.

CPU 102 directly controls a DRAM via a memory support, and performs communication through an I/O port to peripheral devices, that is called an I/O control function. CPU 102 includes a timer, a parallel I/O port and an interruption control system. VDP unit 114 reads display data which have been written in the VRAM by CPU 102. The display data are transmitted to video encoder unit 112 whereby the data are displayed on the TV display 116. VDP unit 114 has at most two screens each composed of background and sprite images, which are of an external block sequence type of 8×8 blocks.

Control unit 104 includes an SCSI controller to which image and sound data are supplied through an SCSI interface from CD-ROM 100. Data supplied to the SCSI controller are buffered in the K-RAM. Control unit 104 also includes a DRAM controller for reading data which have been buffered in the K-RAM with a predetermined timing. In control unit 104, priority judgement is carried out for each dot of natural background image data, and an output signal is transmitted to video encoder unit 112.

Control unit 104 transmits moving image data (full color, pallet), which have been compressed, to image data extension unit 106 which extends image data.

Image data extension unit 106 includes an inverse DCT converter, an inverse quantizing means, a Huffman coding and decoding means and a run-length coding and decoding means. That is, the image data extension unit 106 performs a DCT transformation for a natural moving picture, and treats compressed data encoded by the Huffman coding method and run-length compressed data for a moving animation image and the like.

Video encoder unit 112 superimposes VDP image data, natural background image data and moving image data (full color, pallet) transmitted from VDP unit 114, control unit 104 and image data extension unit 108. Video encoder unit 112 performs color pallet reproducing, special effect processing, D/A converting and the like. Output data of video encoder unit 112 are encoded into an NTSC signal by an external circuit.

ADPCM sound data recorded in CD-ROM 100 are buffered in the K-RAM and then transmitted to sound data output unit 110 by control unit 104. The sound data are reproduced by sound data output unit 110.

Figure 27:
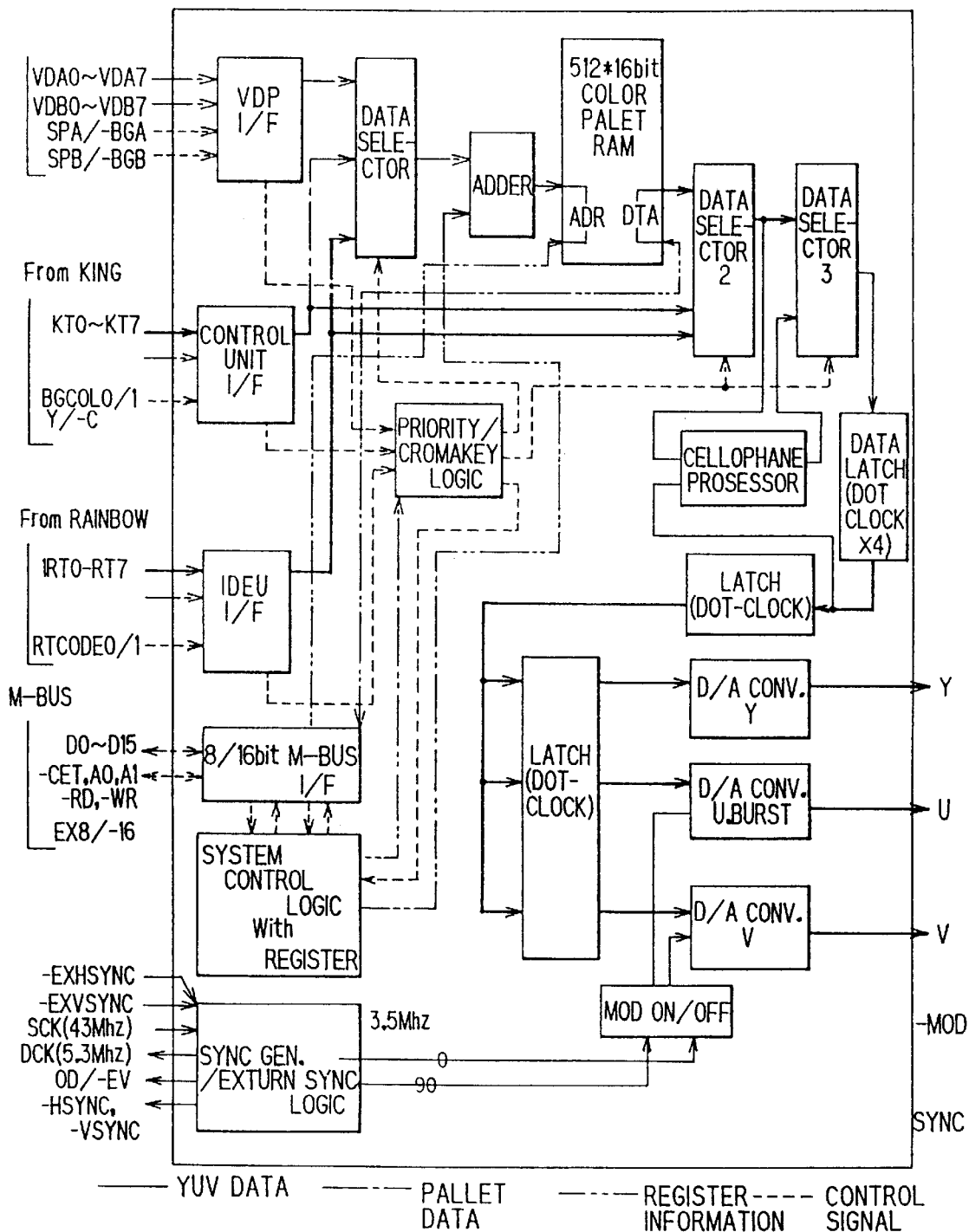
FIG. 27 is a block diagram illustrating a video encoder unit used in the image processing system according to the invention.

FIG. 27 shows the video encoder unit, which is composed of an IC including a synchronizing signal generating circuit, a color pallet RAM, a priority arithmetic circuit, a cellophane arithmetic circuit (for synthesizing upper and lower pictures), a D/A converter for an image signal, an 8/16 bit data bus (M-bus) interface, a VDP interface, a control unit interface and an image data extension unit interface.

According to the conventional system, it is necessary to prepare many frames to display a moving picture, and as a result, a large capacity of a memory is occupied by the image data. On the other hand, according to the invention, the video control unit processes a base picture to be rotated, reduced or extended in order to form frames for a moving image. The frames are displayed at timings controlled by a predetermined program. Therefore, it is sufficient to prepare some base pictures to display a moving image.

We claim:

1. An image processing system for converting image data stored in an external storage means into an image on a display monitor, comprising:

a first memory means for buffering image data transmitted from said external storage means;

a control unit coupled to said external storage means and to said first memory means for processing said image data stored in said first memory means, said control unit transmitting the processed image data in units of predetermined rasters;

an image data extension unit coupled to said control unit for decoding said processed image data;

a second memory means coupled to said image data extension unit for storing the decoded image data; and means for transmitting the decoded image data to the display monitor in accordance with a signal from the control unit;

wherein said control unit further includes a data start register means for controlling a transmission start timing of the image data for each unit of rasters stored in said first memory means to the image data extension unit, to provide a suitable vertical position on the display monitor; and wherein said second memory means includes two RAM's used alternately to increase the process speed of image data.

2. An image processing system according to claim 1, wherein each of said two RAM's stores one unit of predetermined rasters.

3. An image processing system for converting image data stored in an external storage means into an image on a display monitor, comprising:

a first memory means for buffering image data transmitted from said external storage means;

a control unit coupled to said external storage means and to said first memory means for processing said image data stored in said first memory means, said control unit transmitting the processed image data in units of predetermined rasters;

an image data extension unit coupled to said control unit for decoding said processed image data;

a second memory means coupled to said image data extension unit for storing the decoded image data; and means for transmitting the decoded image data to the display monitor in accordance with a signal from the control unit;

wherein said control unit further includes a data start register means for controlling a transmission start timing of the image data for each unit of rasters stored in said first memory means to the image data extension unit, to provide a suitable vertical position on the display monitor; and wherein said control unit processes image data to be compressed, and said image data extension unit extends said compressed image data to be displayed on the display monitor.

4. An image processing system according to claim 1, wherein said data start register means controls a transmission start timing to provide a vertical scroll of said image on said display screen.

5. An image processing system according to claim 1, wherein said means for transmitting said decoded image data to the display monitor includes a video encoder unit.

6. An image processing system according to claim 3, wherein said data start register means controls a transmission start timing to provide a vertical scroll of said image on said display screen.

7. An image processing system according to claim 3, wherein said means for transmitting said decoded image data to the display monitor includes a video encoder unit.

* * * * *